(12) United States Patent
Sunagawa et al.

(10) Patent No.: US 7,105,602 B1
(45) Date of Patent: Sep. 12, 2006

(54) PROCESSING AID FOR THERMOPLASTIC RESIN AND THERMOPLASTIC RESIN COMPOSITION CONTAINING THE SAME

(75) Inventors: Takenobu Sunagawa, Takasago (JP); Riichi Nishimura, Houston, TX (US); Toshiyuki Mori, Akashi (JP); Akira Takaki, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,085

(22) PCT Filed: Apr. 14, 2000

(86) PCT No.: PCT/JP00/02435

§ 371 (c)(1),
(2), (4) Date: Aug. 27, 2001

(87) PCT Pub. No.: WO00/64983

PCT Pub. Date: Nov. 2, 2000

(30) Foreign Application Priority Data

Apr. 23, 1999 (JP) ................................. 11-116791
May 14, 1999 (JP) ................................. 11-134924

(51) Int. Cl.
*C08G 85/00* (2006.01)

(52) U.S. Cl. ...................... 525/170; 525/176; 525/221; 525/222; 526/69; 526/78; 526/208; 526/216; 526/232.2; 526/272; 526/271; 526/309; 526/329.7

(58) Field of Classification Search .................. 526/64, 526/78, 208, 216, 232.2, 272, 271, 309, 329.7; 525/170, 176, 221, 222
See application file for complete search history.

(56) References Cited

U.S. PATENT DOCUMENTS

| | | | | |
|---|---|---|---|---|
| 2,580,901 | A * | 1/1952 | Erickson et al. | 526/273 |
| 3,875,255 | A * | 4/1975 | Kato et al. | 525/283 |
| 3,900,453 | A * | 8/1975 | Shimada et al. | 526/224 |
| 4,034,013 | A * | 7/1977 | Lane | 524/513 |
| 4,070,532 | A * | 1/1978 | Hammer | 528/392 |
| 4,256,805 | A * | 3/1981 | Tugukuni et al. | 428/357 |
| 4,324,868 | A * | 4/1982 | Maeda | 525/54 |
| 4,737,548 | A * | 4/1988 | Kojima et al. | 525/193 |
| 4,833,221 | A * | 5/1989 | Albrecht | 526/64 |
| 5,218,037 | A * | 6/1993 | Orikasa et al. | 524/504 |
| 5,281,665 | A * | 1/1994 | Fukui et al. | 525/84 |
| 5,525,370 | A * | 6/1996 | Hoebeke et al. | 427/195 |
| 5,599,888 | A * | 2/1997 | Higuchi et al. | 526/212 |
| 5,874,495 | A * | 2/1999 | Robinson | 524/300 |
| 6,132,705 | A * | 10/2000 | Schehlmann et al. | 424/78.02 |
| 6,509,420 | B1 * | 1/2003 | Harada et al. | 525/327.3 |

FOREIGN PATENT DOCUMENTS

| | | |
|---|---|---|
| EP | 0423998 | 4/1991 |
| JP | 55-005950 | 1/1980 |
| JP | 55-62950 | 5/1980 |
| JP | 1-245004 | 9/1989 |
| JP | 7-90029 | 4/1995 |
| JP | 7-314615 | 12/1995 |

OTHER PUBLICATIONS

Chemical Abstract XP-002199466; Abstract No. 182082 Methacrylate Polymer Molding Material, p. 31, col. 1 (Jun. 2, 1980).
European Search Report dated Jun. 6, 2002.

* cited by examiner

*Primary Examiner*—Bernard Lipman
(74) *Attorney, Agent, or Firm*—Armstrong, Kratz, Quintos, Hanson & Brooks, LLP

(57) ABSTRACT

The present invention provides a processing aid for thermoplastic resin having a weight average molecular weight of 10,000 to 300,000, which is obtained by polymerizing an alkyl (meth)acrylate, or an alkyl (meth)acrylate and another vinyl monomer copolymerizable therewith, in the presence of a mercaptan having an alkyl ester group with $C_{4-20}$ alkyl group as a chain transfer agent, and/or an organic peroxide having a tertiary-butyl peroxy group as a polymerization initiator.

8 Claims, No Drawings

PROCESSING AID FOR THERMOPLASTIC RESIN AND THERMOPLASTIC RESIN COMPOSITION CONTAINING THE SAME

TECHNICAL FIELD

The present invention relates to a processing aid for thermoplastic resin molding such as calendar molding, blow molding, extrusion molding and injection molding, and a thermoplastic resin composition containing the processing aid, which is excellent in processability, particularly, in peeling property from a metal surface having a high temperature.

BACKGROUND ART

Thermoplastic resins, such as vinylchloride resins, polyethylene, polypropylene, polyester, polystyrene, polycarbonate, a methacrylate resin, and ABS resin, are excellent in physical properties, and have economic advantage and applicability, and have been widely used in various fields. However, since these resins have high melt viscosity and low fluidity, and are susceptible to thermal decomposition, there are problems in processability that they have a narrow processable condition in molding, and that they tend to stick or adhere to a metal surface of a device in processing at a high temperature.

Now there have been proposed many techniques in order to solve the above-mentioned problems in processability.

Applicability of vinylchloride resins, polyethylene, polypropylene, polyester, polystyrene, polycarbonate, a methacrylate resin, ABS resin and the like can be improved by physically blending modifiers such as a lubricant, a stabilizer, a colorant, a filler, a pigment, a cross-linking agent, a tackifier, a plasticizer, a processing aid, an impact modifier and a modifier for thermal deformation temperature, before processing.

Moreover, in order to improve molding processability at molding of vinylchloride resins, polyethylene, polypropylene, polyester, polystyrene, polycarbonate, a methacrylate resin, and ABS resin, some of copolymers compatible with those resins have been investigated as a processing aid.

For example, there have been proposed a method in which a copolymer of methyl methacrylate and styrene is added to vinylchloride resins (Japanese Examined Patent Publication No. 32-4140 (1957)), a method in which a copolymer of styrene and acrylonitrile is added thereto (Japanese Examined Patent Publication No. 29-5246 (1954)), a method in which a copolymer mainly containing methyl methacrylate is added thereto (Japanese Examined Patent Publication No. 40-5311 (1965)), a method in which a copolymer of styrene and alkyl acrylate is added thereto (Japanese Examined Patent Publication No. 37-1384 (1962)) and the like. Secondary processability such as an increase in melting rate of vinyl chloride resins and an increase in tensile elongation at a high temperature can be improved, but there is no effect in reducing adhesiveness to a metal face of the molding device.

Thereafter, in order to reduce adhesiveness to a metal surface of a molding device, there has been investigated a method in which a copolymer of styrene, an alkyl (meth) acrylate and (meth)acrylate having an oxygen atom in addition to an ester bond is added to vinyl chloride resins (Japanese Examined Patent Publication No. 58-56536 (1983)). In this method the adhesiveness is proved to be improved, but this method cannot always satisfy the demands in the market.

DISCLOSURE OF THE INVENTION

Taking the above-mentioned circumstances into consideration, it has been found that the above-mentioned problems could be solved by using a polymer as a processing aid, which was obtained by polymerizing a specific amount of monomers having a specific composition and a specific chain transfer agent to complete the present invention. Moreover, it has been found out that the above-mentioned problems could be solved by using a polymer as a processing aid, which was obtained by polymerizing a specific amount of monomers having a specific composition and a specific polymerization initiator to complete the present invention.

Namely, the present invention relates to a processing aid for thermoplastic resin having a weight average molecular weight of 10,000 to 300,000, which is obtained by polymerizing an alkyl (meth)acrylate, or an alkyl (meth)acrylate and another vinyl monomer copolymerizable therewith, in the presence of a mercaptan having an alkyl ester group with 4 to 20 of alkyl carbon as a chain transfer agent, and/or an organic peroxide having a tertiary-butyl peroxy group as a polymerization initiator.

BEST MODE FOR CARRYING OUT THE INVENTION

The present invention features that a copolymer having a weight average molecular weight of 10,000 to 300,000 is used as a processing aid for thermoplastic resin, which is obtained by polymerizing an alkyl (meth)acrylate, or a monomer mixture comprising an alkyl (meth)acrylate and another vinyl monomer copolymerizable therewith, in the presence of a mercaptan having an alkyl ester group with 4 to 20 of alkyl carbon as a chain transfer agent, and/or an organic peroxide having a tertiary-butyl peroxy group as a polymerization initiator. More preferably, the present invention features that a copolymer is used as a processing aid for thermoplastic resin, which is obtained by polymerizing a mixture comprising a (meth)acrylate having an oxygen atom in addition to an ester bond, another alkyl acrylate, another vinyl monomer copolymerizable therewith, in the presence of a mercaptan having an alkyl ester group with 4 to 20 of alkyl carbon as an organic peroxide having a tertiary-butylperoxy group as a polymerization initiator.

By using the copolymer as the processing aid in an amount of 0.1 to 20 parts by weight based on the thermoplastic resin, processability thereof can be improved without losing physical or chemical properties that the resin originally has. Particularly, there arise effects expected by adding the above modifier, such as drastically improving removability from a metal surface at a high temperature.

The processing aid of the present invention, comprising a copolymer obtained by emulsion polymerizing the above-mentioned monomer mixture, can provide excellent processability, in particular, properties such as a peeling property from a metal surface at a high temperature without degradation in physical and chemical properties of a thermoplastic resin.

The above-mentioned monomer mixture is a mixture comprising (meth)acrylate having an oxygen atom in addition to an ester bond in an amount of preferably 0.1 to 10% by weight, more preferably 0.5 to 5% by weight, and particularly preferably 0.5 to 2% by weight; another alkyl acrylate in an amount of preferably 10 to 99.9% by weight, more preferably 10 to 59.5% by weight, particularly preferably, 10 to 39.5% by weight; and another vinyl monomer copolymerizable therewith in an amount of preferably 0 to 89.9% by weight, more preferably 40 to 89.5% by weight, and particularly preferably 60 to 89.5% by weight.

Examples of the (meth)acrylate having an oxygen atom in addition to an ester bond are acrylate containing an epoxy group such as glycidyl acrylate; methacrylate containing an epoxy group such as glycidyl methacrylate; acrylate containing a hydroxy group such as 2-hydroxyethylacrylate and 2-hydroxypropylacrylate; methacrylate containing a hydroxy group such as 2-hydroxyethylmethacrylate and 2-hydroxypropylmethacrylate; acrylate containing an alcoxy group such as methoxyethylacrylate and ethoxyethylacrylate; methacrylate containing an alcoxy group such as methoxyethylmethacrylate and ethoxyethylmethacrylate, and the like. These materials may be used solely or in a combination use of two or more thereof. In order to obtain an excellent peeling property from a metal surface at a high temperature, these materials preferably comprises 0.1 to 10% by weight. If the content is less than or more than this range, a sufficient peeling effect can not be expected.

Another alkyl acrylate is preferably an alkyl acrylate containing an alkyl group having 1 to 20 carbon atoms. Examples thereof are those having an alkyl group having 3 to 8 carbon atoms such as 2-ethylhexylacrylate, butylacrylate, and ethylacrylate. These may be used solely or in a combination use of two or more thereof. In order to obtain an excellent peeling property from a metal surface at a high temperature, these materials preferably comprise 10 to 99.9% by weight thereof. If the content is less or more than this range, a sufficient peeling effect can not be expected.

Examples of the other vinyl monomer that is copolymerizable with a small amount of (meth)acrylate containing an oxygen atom in addition to an ester bond and the other alkyl acrylate are alkyl methacrylates such as methyl methacrylate and butyl methacrylate, aromatic vinyls such as styrene, α-methylstyrene and chlorostyrene, acrylonitrile, methacrylonitrile. These may be used solely or in a combination use of two or more thereof. In order to obtain an excellent peeling property from a metal surface at a high temperature, these materials preferably comprises 0 to 89.9 weight %. If the content is less or more than this range, a sufficient peeling effect can not be expected.

There is no particular limitation for the chain transfer agent. Conventional chain transfer agents, such as tertiary-dodecyl mercaptan, n-dodecyl mercaptan, tertiary-decyl mercaptan and n-decyl mercaptan, may be used depending on demand. An amount of the chain transfer agent is preferably 0.5 to 3 parts by weight based on 100 parts by weight of the monomers in total.

In particular, a preferable chain transfer agent is a mercaptan containing an alkyl ester group having $C_{4-20}$ alkyl group. Examples thereof are tertiary-butylthioglycolate, 2-ethylhexylthioglycolate, 2-ethylhexyl-β-mercaptopropionate, and tridecylmercaptopropionate. These may be used solely or in a combination use of two or more thereof. In order to obtain an excellent peeling property from a metal surface at a high temperature, these materials comprise preferably 0.5 to 3 parts by weight based on 100 parts by weight of the monomers in total.

From the viewpoint of improving the peeling property from a metal surface at a high temperature, a weight average molecular weight of the copolymer comprising the monomer mixture is preferably 10,000 to 300,000.

There is no particular limitation for the polymerization initiator, but an organic peroxide having a tertiary-butyl peroxy group is preferably used.

Examples of the organic peroxide having a tertiary-butyl peroxy group are tertiary-butylhydroperoxide, di(tertiary-butyl) peroxyde, tertiary-butyl-α-cumylperoxide, tertiary-butylisopropylcarbonate, tertiary-butylperoxyacetate, tertiary-butylperoxyisobutylate, tertiary-butylperoxyoctanate, tertiary-butylperoxylaurate, tertiary-butylperoxypivalate, tertiary-butylperoxyneodecanoate, and tertiary-butylperoxybenzoate. These may be used solely or in a combination use of two or more thereof. In order to obtain an excellent peeling property from a metal surface at a high temperature, an amount thereof is preferably 0.1 to 5 parts by weight, and more preferably 0.5 to 3 parts by weight.

The processing aid of the present invention can be prepared by using, for example, the following method. First, the monomer mixture is emulsion polymerized in the presence of a suitable medium, an emulsifier and the chain transfer agent and/or the polymerization initiator. The medium used in the emulsification polymerization is usually water.

The processing aid of the present invention may be a polymer prepared by single step polymerization or a polymer prepared by a multi-steps polymerization such as two steps or three steps.

As the emulsifier, there can be used a known emulsifier. Examples thereof are anionic surfactants such as a fatty acid salt, an alkyl sulfate, an alkyl benzene sulfate, an alkyl phosphate, and a diester of sulfosuccinic acid, and non-ionic surfactants such as a polyoxyethylene alkyl ether and a polyoxyethylene fatty acid ester.

As the above-mentioned chain transfer agent, there can be used the above-mentioned mercaptan having an alkyl ester group with $C_{4-20}$ alkyl group.

As the polymerization initiator, there is usually used a polymerization initiator of the redox type, which contains the above-mentioned organic peroxide having a tertiary-butylperoxy group in combination with a reducing agent. It is possible to use a general organic peroxide in a combination therewith, if necessary.

There is no particular limitation for a temperature, time and the like at the polymerization condition. Usual temperature and time may be selected, and these may be suitably adjusted to obtain a desired molecular weight and particle size.

The processing aid of the present invention is mixed with a thermoplastic resin according to a usual method to obtain the thermoplastic resin composition of the present invention.

An amount at mixing of the thermoplastic resin and the processing aid can be widely set, but the amount thereof is preferably 0.1 to 20 parts by weight, and more preferably 0.5 to 3 parts by weight based on 100 parts by weight of the thermoplastic resin. If the amount is less than 0.1 parts by weight, a sufficient effect can not be obtained. And if the amount is more than 20 parts by weight, transparency of the molded article becomes low and many fish eyes tend to occur.

The thermoplastic resin includes all normal thermoplastic resins. In particular, there can preferably be vinyl chloride resins, polyethylene, polypropylene, polyester, polystyrene, polycarbonate, a methacrylate resin, ABS resin and the like from the viewpoint of improving the peeling property from a metal surface at a high temperature. Among those, vinyl chloride resins are preferable.

The vinyl chloride resins are a polymer comprising 80 to 100% by weight of vinyl chloride unit and 0 to 20% by weight of another monomer copolymerizable with the vinyl chloride monomer. As the other monomer copolymerizable with the vinyl chloride monomer, examples thereof are vinyl acetate, propylene, styrene, acrylate and the like. These may be used solely or in a combination use of two or more thereof.

There is no particular limitation for an average polymerization degree and other factors of the vinyl chloride resins, and there may be employed the conventionally used vinyl chloride resins. Examples of the vinyl chloride resins are poly(vinyl chloride), a copolymer of a vinyl chloride monomer of at least 80% by weight and another copolymerizable monomer, for example, vinyl acetate, propylene, styrene, acrylate, and the like, and chlorinated poly(vinyl chloride). These include homopolymers, and copolymers which contain at least 80% by weight of vinyl chloride and chlorinated poly(vinyl chloride). These monomers may be used solely or in a combination use of two or more thereof.

To the vinyl chloride resin composition of the present invention can be suitably added a stabilizer, a lubricant, an impact modifier, a plasticizer, a colorant, a filler and the like at blending, if necessary.

Example of the above-mentioned polyester is poly(ethylene terephthalate). Moreover, example of the above-mentioned methacrylate resin is poly(methyl methacrylate).

The thermoplastic resin composition of the present invention is excellent in processability, and they can be molded by a method such as blow molding, injection molding, calendar molding or extrusion molding. The obtained molded article is excellent in appearance properties such as transparency, glow and surface smoothness, as well as in secondary processability, and the resin composition can be suitably applied for various fields such as a film, a sheet, and a profile molded article.

The present invention is explained in detail by using examples and comparative examples. But the present invention is not intended to be limited thereby. Hereinafter, "parts" represents "parts by weight" based on 100 parts by weight of the monomers in total, unless otherwise specified. In examples and comparative examples, BA represents butyl acrylate, EA represents ethyl acrylate, 2EHA represents 2-ethylhexyl acrylate, St represents styrene, MMA represents methyl methacrylate, AN represents acrylonitrile, GMA represents glycidyl methacrylate, 2HEMA represents 2-hydroxyethyl methacrylate, 2EHTG represents 2-ethylhexyl thioglycolate, ETOM represents ethoxyethyl methacrylate, GA represents glycidyl acrylate, 2HEA represents 2-hydroxyethyl acrylate, ETOA represents ethoxyethyl acrylate, TBHP represents tertiary-butylhydroperoxide.

The following description shows an evaluation method applied to examples and comparative examples.

(Polymerization Conversion)

Polymerization conversion was calculated based on the following equation:

Polymerization conversion (%)=(Amount of produced polymer/Amount of loaded monomer)× 100(%)

(Roll Peeling Property)

In order to evaluate the roll peeling property, there was kneaded a mixture comprising 100 parts of poly(vinyl chloride) (Kane vinyl S1007 available from Kaneka Corp.), 1 part of a processing aid, 2.0 parts of a stabilizer of octyl tin mercaptan (TVS #8831 available from Nitto Kasei K.K.), 1.0 part of a lubricant (KALCOHL 8668 available from Kao Corp.), and 3.0 parts of dioctyl phthalate (DOP) by using a 6-inch roll at 190° C., to evaluate peeling property from the roll surface after 10 minutes. The evaluation was made in accordance with ten ranks. Based upon the following criteria, 10 was evaluated as the highest peeling property, and 1 was evaluated as the lowest.

10: A molten sheet maintains a state removable from a hot roll surface for 10 minutes or more.

5: A molten sheet maintains a state removable from a hot roll surface for at least 5 minutes to less than 6 minute.

1: A molten sheet is maintained removable from a hot roll surface for 2 minutes or less.

(Transparency)

In order to evaluate transparency, after the composition was kneaded for 5 minutes at 170° C. by using an 8-inch roll, it was then pressed for 15 minutes at 180° C. to prepare a plaque having a thickness of 3 mm. Light transmittance for all light rays and haze of the plaque were measured by using an integral bulb-type light-ray transmittance measuring device according to JIS-6714 standard. It shows that the larger the value of the transmittance is, the better the transparency becomes, and the smaller the value of the haze, the better the transparency becomes.

EXAMPLE 1

A reactor equipped with a stirrer and a condenser was charged with 200 parts of distilled water, 1.2 parts of sodium dioctylsulfosuccinate, 0.01 part of sodium ethylenediaminetetraacetate, 0.005 part of ferrous sulfate heptahydrate, and 0.5 parts of sodium formaldehyde hydrosulfite. Then, after inside of the reactor was replaced by nitrogen, the reactor was heated to 60° C. with stirring. Next, to this was continuously added for two hours a mixture comprising 30% by weight of methyl methacrylate (MMA), 19% by weight of styrene (St) and 0.2 part of tertiary-butyl hydroperoxide (TBHP). One hour after completion of the addition, to this was further continuously added for three hours a mixture comprising 35% by weight of St, 15% by weight of butyl acrylate (BA), 1.0% by weight of glycidyl methacrylate (GMA), 1.0 part of 2-ethylhexyl thioglycolate (2 EHTG) and 0.8 parts of TBHP. After completion of the addition, the mixture was further stirred for one hour, and then cooled to obtain a copolymer in latex. Polymerization conversion was 99.4%.

The obtained latex was coagulated with an aqueous solution of calcium chloride. After the latex was treated up to 90° C., the latex was filtrated with a centrifugal dehydrator. The obtained dehydrated cake of the copolymer was washed with water and dried for 15 hours at 50° C. with a parallel-flow dryer to obtain a white powdery sample (1) prepared by two steps polymerization. A weight average molecular weight of the obtained sample was 70,000 measured by GPC. The obtained sample was subjected to the above-mentioned evaluation on the roll peeling property. Table 1 shows the results.

EXAMPLES 2 TO 7 AND COMPARATIVE EXAMPLES 1 TO 3

According to compositions shown in Table 1, samples (2) to (10) were obtained by the same manner as in Example 1. The obtained samples were subjected to the above-mentioned evaluation on the roll peeling property. Table 1 shows the results.

From the results shown in Table 1, as indicated by samples (1) and (4) to (9), it is found that a composition having an excellent roll peeling property is obtained when a composition of the monomer mixture is in the range of the present invention. On the other hand, there is a reduction in the roll peeling property when the composition is out of the range of the present invention, that is, in the case of samples (2), (3) and (10).

reactor was heated to 60° C. with stirring. Next, to this was continuously added for two hours a mixture comprising 24% by weight of MMA, 15% by weight of St and 0.2 part of TBHP. One hour after completion of the addition, to this was further continuously added for three hours a mixture comprising 35% by weight of St, 15% by weight of BA, 1.0% by weight of GMA, 1.0 part of 2EHTG and 0.7 part of TBHP. One hour after completion of the addition, to this was further continuously added for thirty minutes a mixture comprising 10% by weight of MMA and 0.1 part of TBHP. After completion of the addition, this was further stirred for one hour, and then cooled to obtain a copolymer in latex.

Polymerization conversion was 99.5%. The obtained latex was coagulated by an aqueous solution of calcium chloride. After the latex was heated up to 90° C., the latex was filtrated with a centrifugal dehydrator. The obtained dehydrated cake of the copolymer was washed with water and dried for 15 hours at 50° C. with a parallel-flow dryer to obtain a white powdery polymer sample (11) prepared by three steps polymerization. A weight average molecular weight of the obtained sample was 80,000 measured by GPC. The obtained sample was subjected to the above-mentioned evaluation on the roll peeling property. Table 2 shows the results.

EXAMPLES 9 TO 14 AND COMPARATIVE EXAMPLES 4 TO 6

According to compositions shown in Table 2, samples (12) to (20) were obtained by the same manner as in Example 8. The obtained samples were subjected to the above-mentioned evaluation on the roll peeling property. Table 2 shows the results.

TABLE 1

| Example No. | Sample | Composition of mixture before polymerization (% by weight) | | | | | | | | Chain transfer agent (parts) | Organic peroxide (parts) | Roll peeling property | Weight average molecalar weight |
|---|---|---|---|---|---|---|---|---|---|---|---|---|---|
| | | Polymer at first step | | | Polymer at second step | | | | | | | | |
| | | MMA | AN | St | BA | EA | 2EHA | St | GMA | 2EHTG | TBHP | | |
| Ex. 1 | (1) | 30 | 19 | 15 | | | | 35 | 1.0 | 1.0 | 1.0 | 10 | 70,000 |
| Com. Ex. 1 | (2) | 30 | 20 | 15 | | | | 35 | 0 | 1.0 | 1.0 | 4 | 80,000 |
| Com. Ex. 2 | (3) | 26 | 18 | 13 | | | | 31 | 12 | 1.0 | 1.0 | 4 | 70,000 |
| Ex. 2 | (4) | 6 | 4 | 80 | | | | 6 | 1.0 | 1.0 | 1.0 | 9 | 80,000 |
| Ex. 3 | (5) | 30 | 19 | 11 | | | | 39 | 1.0 | 1.0 | 1.0 | 9 | 70,000 |
| Ex. 4 | (6) | 30 | 19 | | 15 | | | 35 | 1.0 | 1.0 | 1.0 | 9 | 70,000 |
| Ex. 5 | (7) | 30 | 19 | | | 15 | | 35 | 1.0 | 1.0 | 1.0 | 9 | 70,000 |
| Ex. 6 | (8) | | 30 | 19 | 15 | | | 35 | 1.0 | 1.0 | 1.0 | 9 | 80,000 |
| Ex. 7 | (9) | 49 | | 50 | | | | | 1.0 | 1.0 | 1.0 | 8 | 70,000 |
| Com. Ex. 3 | (10) | 30 | 19 | 9 | | | | 41 | 1.0 | 1.0 | 1.0 | 3 | 70,000 |

EXAMPLE 8

A reactor equipped with a stirrer and a condenser was chaged with 200 parts of distilled water, 1.2 parts of sodium dioctylsulfosuccinate, 0.01 part of sodium ethylenediaminetetraacetate, 0.005 part of ferrous sulfate heptahydrate, and 0.5 part of sodium formaldehyde hydrosulfite. Then, after inside of the reactor was replaced with nitrogen gas, the As indicated by samples (11) and (14) to (19), from the results shown in Table 2, it is found that a composition having an excellent roll peeling property is obtained when the composition of the monomer mixture is in the range of the present invention. On the other hand, there is a reduction in the roll peeling property when the composition is out of the range of the present invention, that is, in the case of samples (12), (13) and (20).

TABLE 2

| Example No. | Sample | Composition of mixture before polymerization (% by weight) | | | | | | | | | | Chain transfer agent (parts) 2EHTG | Organic peroxide (parts) TBHP | Roll peeling property | Weight average molecalar weight |
|---|---|---|---|---|---|---|---|---|---|---|---|---|---|---|---|
| | | Polymer at first step | | | Polymer at second step | | | | | Polymer at third step | | | | | |
| | | MMA | AN | St | BA | EA | 2EHA | St | GMA | MMA | AN | | | | |
| Ex. 8 | (11) | 24 | | 15 | 15 | | | 35 | 1.0 | 10 | | 1.0 | 1.0 | 10 | 80,000 |
| Com. Ex. 4 | (12) | 24 | | 16 | 15 | | | 35 | 0 | 10 | | 1.0 | 1.0 | 4 | 80,000 |
| Com. Ex. 5 | (13) | 21 | | 14 | 13 | | | 31 | 12 | 9 | | 1.0 | 1.0 | 4 | 90,000 |
| Ex. 9 | (14) | 6 | | 4 | 83 | | | 6 | 1.0 | 3 | | 1.0 | 1.0 | 9 | 80,000 |
| Ex. 10 | (15) | 23 | | 15 | 11 | | | 39 | 1.0 | 12 | | 1.0 | 1.0 | 9 | 80,000 |
| Ex. 11 | (16) | 24 | | 15 | | 15 | | 35 | 1.0 | 10 | | 1.0 | 1.0 | 9 | 80,000 |
| Ex. 12 | (17) | 24 | | 15 | | | 15 | 35 | 1.0 | 10 | | 1.0 | 1.0 | 9 | 80,000 |
| Ex. 13 | (18) | | 24 | 15 | 15 | | | 35 | 1.0 | | 10 | 1.0 | 1.0 | 9 | 90,000 |
| Ex. 14 | (19) | 39 | | | 50 | | | | 1.0 | 10 | | 1.0 | 1.0 | 8 | 80,000 |
| Com. Ex. 6 | (20) | 24 | | 15 | 9 | | | 41 | 1.0 | 10 | | 1.0 | 1.0 | 3 | 80,000 |

EXAMPLES 15 TO 22

The samples (21) to (28) were obtained by setting all the monomers except the amount of GMA used in Example 8 was charged to 100 parts, and adding respective monomers in amounts (parts) shown in Table 3 in the same manner as in Example 8. The obtained samples were subjected to the above-mentioned evaluation on the roll peeling property. Table 3 shows the results.

As indicated by samples (11) and (21) to (28), from the results shown in Table 3, it is found that a composition having an excellent roll peeling property is obtained when the kind and amount of (meth)acrylate having oxygen atoms in addition to an ester bond are in the range of the present invention.

TABLE 3

| Example No. | Sample | Monomer | | Roll peeling property | Weight average molecalar weight |
|---|---|---|---|---|---|
| | | Kind | Amount [parts] | | |
| Ex. 8 | (11) | GMA | 1.0 | 10 | 80,000 |
| Ex. 15 | (21) | 2HEMA | 1.0 | 10 | 90,000 |
| Ex. 16 | (22) | ETOMA | 1.0 | 10 | 80,000 |
| Ex. 17 | (23) | GA | 1.0 | 10 | 80,000 |
| Ex. 18 | (24) | 2HEA | 1.0 | 10 | 80,000 |
| Ex. 19 | (25) | ETOA | 1.0 | 10 | 90,000 |
| | | GMA | 0.5 | | |

TABLE 3-continued

| Example No. | Sample | Monomer | | Roll peeling property | Weight average molecalar weight |
|---|---|---|---|---|---|
| | | Kind | Amount [parts] | | |
| Ex. 20 | (26) | { GMA | 0.5 | 10 | 80,000 |
| | | 2HEA | 0.5 | | |
| Ex. 21 | (27) | GMA | 0.3 | 8 | 80,000 |
| Ex. 22 | (28) | GMA | 3.0 | 9 | 80,000 |
| Com. Ex. 4 | (12) | GMA | 0 | 4 | 80,000 |
| Com. Ex. 5 | (13) | GMA | 12 | 4 | 90,000 |

EXAMPLES 23 TO 26 AND COMPARATIVE EXAMPLES 7 TO 11

The samples (29) to (37) were obtained in the same manner as in Example 8 except that 1.0 part of 2EHTG was replaced by compounds shown in Table 4. The obtained samples were subjected to the above-mentioned evaluation on the roll peeling property. Table 4 shows the results.

As indicated by samples (11), (29), (30), (32) and (33), from the results shown in Table 4, it is found that a composition having an excellent roll peeling property can be obtained when the particular chain transfer agent is used in an amount of the present invention. On the other hand, roll peeling property becomes low when the particular chain transfer agent is not used or an amount of the chain transfer agent is out of the range of the present invention, that is, in the case of samples (31) and (34) to (37).

TABLE 4

| Example No. | Sample | Chain transfer agent | | Roll peeling property | Weight average molecalar weight |
|---|---|---|---|---|---|
| | | Kind | Amount (parts) | | |
| Ex. 8 | (11) | 2EHTG | 1.0 | 10 | 80,000 |
| Ex. 23 | (29) | 2EHTG | 0.5 | 9 | 130,000 |
| Ex. 24 | (30) | 2EHTG | 3.0 | 9 | 60,000 |
| Com. Ex. 7 | (31) | 2EHTG | 0 | 4 | 210,000 |
| Ex. 25 | (32) | 2-ethylhexyl-β-mercaptopropionate | 1.0 | 10 | 80,000 |
| | | 2EHTG | 0.5 | | |

TABLE 4-continued

| Example No. | Sample | Chain transfer agent Kind | Amount (parts) | Roll peeling property | Weight average molecalar weight |
|---|---|---|---|---|---|
| Ex. 26 | (33) | 2-ethylhexyl-β-mercaptopropionate | 0.5 | 10 | 80,000 |
| Com. Ex. 8 | (34) | tert-dodecyl mercaptane | 1.0 | 5 | 80,000 |
| Com. Ex. 9 | (35) | n-dodecyl mercaptane | 1.0 | 5 | 80,000 |
| Com. Ex. 10 | (36) | n-octyl mercaptane | 1.0 | 5 | 80,000 |
| Com. Ex. 11 | (37) | thioglycolic acid | 1.0 | 4 | 80,000 |

EXAMPLES 27 TO 29 AND COMPARATIVE EXAMPLES 12 TO 15

The samples (38) to (44) were obtained in the same manner as in Example 8 except that 1.0 part of TBHP was replaced by compounds shown in Table 5. The obtained samples were subjected to the above-mentioned evaluation on the roll peeling property. Table 5 shows the results.

As indicated by samples (11), (38) to (40), from the results shown in Table 5, it is found that a composition having an excellent roll peeling property is obtained when the particular organic peroxide having a tertiary butylperoxy group is used in an amount of the present invention.

On the other hand, the roll peeling property becomes low, when the particular organic peroxide having a tertiary-butylperoxy group is not used or an amount thereof is out of the range of the present invention, that is, in the case of samples (41) to (44).

EXAMPLES 30 TO 32 AND COMPARATIVE EXAMPLES 16 AND 17

Sample (11) obtained in Example 8 was blended with vinyl chloride resin and additives at the ratios shown in Table 6, and the obtained samples were subjected to the transparency evaluation and the evaluation on the roll peeling property. Table 6 shows the results.

From the results shown in Table 6, it is found that a composition having an excellent roll peeling property is obtained when the amounts of addition are in the range of the present invention.

TABLE 5

| Example No. | Sample | Organic peroxide Kind | Amount (parts) | Roll peeling property | Weight average molecalar weight |
|---|---|---|---|---|---|
| Ex. 8 | (11) | TBHP | 1.0 | 10 | 80,000 |
| Ex. 27 | (38) | TBHP | 0.3 | 9 | 180,000 |
| Ex. 28 | (39) | di-tert-butyl peroxide | 1.0 | 10 | 80,000 |
| Ex. 29 | (40) | TBHP | 0.5 | 10 | 80,000 |
| | | di-tert-butyl peroxide | 0.5 | | |
| Com. Ex. 12 | (41) | paramentane hydroperoxide | 1.0 | 6 | 80,000 |
| Com. Ex. 13 | (42) | cumene hydroperoxide | 1.0 | 5 | 80,000 |
| Com. Ex. 14 | (43) | benzoyl peroxide | 1.0 | 5 | 80,000 |
| Com. Ex. 15 | (44) | TBHP | 0.05 | 6 | 80,000 |
| | | cumene hydroperoxide | 1.0 | | |

TABLE 6

| Example No. | Poly (vinyl chloride) (parts) | Polymer (11) (parts) | Stabilizer (parts) | Lubricant (parts) | DOP (parts) | Transparency Transmittance (%) | Haze (%) | Roll peeling property |
|---|---|---|---|---|---|---|---|---|
| Ex. 30 | 100 | 1.0 | 2.0 | 1.0 | 3.0 | 84.2 | 20.8 | 10 |
| Ex. 31 | 100 | 0.3 | 2.0 | 1.0 | 3.0 | 84.8 | 20.8 | 7 |
| Ex. 32 | 100 | 15 | 2.0 | 1.0 | 3.0 | 80.8 | 21.2 | 8 |
| Com. Ex. 16 | 100 | 0 | 2.0 | 1.0 | 3.0 | 86.0 | 20.6 | 1 |
| Com. Ex. 17 | 100 | 25 | 2.0 | 1.0 | 3.0 | 73.7 | 28.1 | 3 |

EXAMPLES 33 TO 40 AND COMPARATIVE EXAMPLES 18 TO 25

Sample (11) obtained in Example 8 was blended with a thermoplastic resin and a mixture of poly(vinyl chloride) and another thermoplastic resin at the ratios shown in Table 7, and the obtained samples were subjected to the above-mentioned evaluation on the roll peeling property. Table 7 shows the results.

From the results shown in Table 7, it is found that an excellent roll peeling property is obtained, when the amounts of addition are in the range of the present invention. In Examples 30, 33, 40 and Comparative Examples 16, 18 and 25, there were added 2.0 parts of octyl tin mercaptan based stabilizer (TVS #8831 available from Nitto Kasei K.K.), 1.0 part of a lubricant (KALCOHL 8668 available from Kao Corp.), and 3.0 parts of DOP thereto.

In the Table, PVC represents poly(vinyl chloride), CPVC represents chlorinated poly(vinyl chloride), PP represents polypropylene, PET represents poly(ethylene terephthalate), PC represents polycarbonate, PS represents polystyrene, PMMA represents poly(methyl methacrylate) and ABS represents an ABS resin.

1.0 part of tertiary-dodecyl mercaptan (TDM). Polymerization conversion was 99.6%. A weight average molecular weight of the obtained sample was 70,000 measured by GPC.

The obtained sample was subjected to the above-mentioned evaluation on the roll peeling property. Table 8 shows the results.

EXAMPLES 42 TO 49 AND COMPARATIVE EXAMPLES 26 TO 29

According to compositions shown in Table 8, samples (46) to (57) were obtained in the same manner as in Example 41.

The obtained samples were subjected to the above-mentioned evaluation of the roll peeling property. Table 8 shows the results.

As indicated by samples (45) to (47) and (51) to (56), from the results shown in Table 8, it is found that a composition having an excellent roll peeling property is obtained when the composition of the monomer mixture is in the range of the present invention. On the other hand, when the composition is out of the range of the present invention, that is, in the case of samples (48) to (50) and (57), there is a decline of the roll peeling property.

TABLE 7

| Example No. | Poly(vinyl chloride resins (parts)) | | Thermoplastic resin (parts) | | | | | | Polymer (11) (parts) | Roll peeling property |
|---|---|---|---|---|---|---|---|---|---|---|
| | PVC | CPVC | PP | PET | PC | PS | PMMA | ABS | | |
| Ex. 30 | 100 | | | | | | | | 1.0 | 10 |
| Ex. 33 | | 100 | | | | | | | 1.0 | 9 |
| Ex. 34 | | | 100 | | | | | | 1.0 | 9 |
| Ex. 35 | | | | 100 | | | | | 1.0 | 9 |
| Ex. 36 | | | | | 100 | | | | 1.0 | 9 |
| Ex. 37 | | | | | | 100 | | | 1.0 | 9 |
| Ex. 38 | | | | | | | 100 | | 1.0 | 9 |
| Ex. 39 | | | | | | | | 100 | 1.0 | 10 |
| Ex. 40 | 70 | | | | | | | 30 | 1.0 | 10 |
| Com. Ex. 16 | 100 | | | | | | | | 0 | 1 |
| Com. Ex. 18 | | 100 | | | | | | | 0 | 1 |
| Com. Ex. 19 | | | 100 | | | | | | 0 | 1 |
| Com. Ex. 20 | | | | 100 | | | | | 0 | 1 |
| Com. Ex. 21 | | | | | 100 | | | | 0 | 1 |
| Com. Ex. 22 | | | | | | 100 | | | 0 | 1 |
| Com. Ex. 23 | | | | | | | 100 | | 0 | 1 |
| Com. Ex. 24 | | | | | | | | 100 | 0 | 1 |
| Com. Ex. 25 | 70 | | | | | | | 30 | 0 | 1 |

EXAMPLE 41

The sample (45) was obtained in the same manner as in Example 1 except that 1.0 part of 2EHTG was replaced by

TABLE 8

| Example No. | Sample | Composition of mixture before polymerization (% by weight) | | | | | | | | Chain transfer agent (parts) | Organic peroxide (parts) | Roll peeling property | Weight average molecular weight |
|---|---|---|---|---|---|---|---|---|---|---|---|---|---|
| | | Polymer at first step | | | Polymer at second step | | | | | TDM | TBHP | | |
| | | MMA | AN | St | BA | EA | 2EHA | St | GMA | | | | |
| Ex. 41 | (45) | 30 | 19 | 15 | | | | 35 | 1.0 | 1.0 | 1.0 | 10 | 70,000 |
| Ex. 42 | (46) | 30 | 19 | 15 | | | | 35 | 1.0 | 0.2 | 1.0 | 9 | 150,000 |
| Ex. 43 | (47) | 30 | 19 | 15 | | | | 35 | 1.0 | 0 | 1.0 | 7 | 210,000 |
| Com. Ex. 26 | (48) | 30 | 20 | 15 | | | | 35 | 0 | 1.0 | 1.0 | 4 | 70,000 |

TABLE 8-continued

| Example | | Composition of mixture before polymerization (% by weight) | | | | | | | | Chain transfer agent (parts) | Organic peroxide (parts) | Roll peeling property | Weight average molecular weight |
|---|---|---|---|---|---|---|---|---|---|---|---|---|---|
| | | Polymer at first step | | | Polymer at second step | | | | | | | | |
| No. | Sample | MMA | AN | St | BA | EA | 2EHA | St | GMA | TDM | TBHP | | |
| Com. Ex. 27 | (49) | 30 | | 20 | 15 | | | 35 | 0 | 0 | 1.0 | 3 | 210,000 |
| Com. Ex. 28 | (50) | 26 | | 18 | 13 | | | 31 | 12 | 1.0 | 1.0 | 4 | 70,000 |
| Ex. 44 | (51) | 6 | | 4 | 83 | | | 6 | 1.0 | 1.0 | 1.0 | 8 | 70,000 |
| Ex. 45 | (52) | 30 | | 19 | 11 | | | 39 | 1.0 | 1.0 | 1.0 | 8 | 70,000 |
| Ex. 46 | (53) | 30 | | 19 | | 15 | | 35 | 1.0 | 1.0 | 1.0 | 8 | 70,000 |
| Ex. 47 | (54) | 30 | | 19 | | | 15 | 35 | 1.0 | 1.0 | 1.0 | 8 | 80,000 |
| Ex. 48 | (55) | | 30 | 19 | 15 | | | 35 | 1.0 | 1.0 | 1.0 | 8 | 80,000 |
| Ex. 49 | (56) | 49 | | | 50 | | | | 1.0 | 1.0 | 1.0 | 8 | 80,000 |
| Com. Ex. 29 | (57) | 30 | | 19 | 8 | | | 42 | 1.0 | 1.0 | 1.0 | 2 | 70,000 |

EXAMPLE 50

The same manner as in Example 1 was used except that 1.0 part of 2EHTG was replaced by 1.0 part of TDM to obtain sample (58). The polymerization conversion was 99.7%. The weight average molecular weight of the resulting sample was measured by GPC, thereby obtaining 90,000.

The resulting sample was subjected to the above-mentioned evaluation on the roll peeling property. Table 9 shows the results of evaluation.

EXAMPLES 51 TO 58 AND COMPARATIVE EXAMPLES 30 TO 33

According to compositions shown in Table 9, samples (59) to (70) were obtained in the same manner as in Example 50. The obtained samples were subjected to the above-mentioned evaluation on the roll peeling property. Table 9 shows the results.

As indicated by samples (58) to (60) and (64) to (69), from the results shown in Table 9, it is found that a composition having an excellent roll peeling property is obtained when the composition of the monomer mixture is in the range of the present invention. On the other hand, when the composition is out of the range of the present invention, that is, in the case of samples (61) to (63) and (70), there is a decline of the roll peeling property.

TABLE 9

| Example | | Composition of mixture before polymerization (% by weight) | | | | | | | | | | Chain transfer agent (parts) | Organic peroxide (parts) | Roll peeling property | Weight average molecular weight |
|---|---|---|---|---|---|---|---|---|---|---|---|---|---|---|---|
| | | Polymer at first step | | | Polymer at second step | | | | | Polymer at third step | | | | | |
| No. | Sample | MMA | AN | St | BA | EA | 2EHA | St | GMA | MMA | AN | TDM | TBHP | | |
| Ex. 50 | (58) | 24 | | 15 | 15 | | | 35 | 1.0 | 10 | | 1.0 | 1.0 | 10 | 90,000 |
| Ex. 51 | (59) | 24 | | 15 | 15 | | | 35 | 1.0 | 10 | | 0.2 | 1.0 | 9 | 150,000 |
| Ex. 52 | (60) | 24 | | 15 | 15 | | | 35 | 1.0 | 10 | | 0 | 1.0 | 7 | 200,000 |
| Com. Ex. 30 | (61) | 24 | | 16 | 15 | | | 35 | 0 | 10 | | 1.0 | 1.0 | 4 | 90,000 |
| Com. Ex. 31 | (62) | 24 | | 16 | 15 | | | 35 | 0 | 10 | | 0 | 1.0 | 3 | 210,000 |
| Com. Ex. 32 | (63) | 21 | | 14 | 13 | | | 31 | 12 | 9 | | 1.0 | 1.0 | 4 | 80,000 |
| Ex. 53 | (64) | 6 | | 4 | 83 | | | 6 | 1.0 | 3 | | 1.0 | 1.0 | 8 | 80,000 |
| Ex. 54 | (65) | 23 | | 15 | 11 | | | 39 | 1.0 | 12 | | 1.0 | 1.0 | 9 | 90,000 |
| Ex. 55 | (66) | 24 | | 15 | | 15 | | 35 | 1.0 | 10 | | 1.0 | 1.0 | 8 | 90,000 |
| Ex. 56 | (67) | 24 | | 15 | | | 15 | 35 | 1.0 | 10 | | 1.0 | 1.0 | 8 | 80,000 |
| Ex. 57 | (68) | | 24 | 15 | 15 | | | 35 | 1.0 | | 10 | 1.0 | 1.0 | 8 | 90,000 |
| Ex. 58 | (69) | 39 | | | 50 | | | | 1.0 | 10 | | 1.0 | 1.0 | 8 | 80,000 |
| Com. Ex. 33 | (70) | 24 | | 15 | 8 | | | 42 | 1.0 | 10 | | 1.0 | 1.0 | 2 | 80,000 |

EXAMPLES 59 TO 66

Samples (71) to (78) were obtained in the same manner as in Example 50, by setting all monomers except GMA used in Example 50 to 100 parts by weight, and using respective monomers shown in Table 3 in the respective blending amounts (parts by weight). The obtained samples were subjected to the above-mentioned evaluation of the roll peeling property. Table 10 shows the results.

As indicated by samples (58) and (71) to (78), from the results shown in Table 9, it is found that a composition having an excellent roll peeling property is obtained when the (meth)acrylate having an oxygen atom in addition to an ester bond is used in an amount of the present invention.

TABLE 10

| Example No. | Sample | Monomer Kind | Amount [parts] | Roll peeling property | Weight average molecular weight |
|---|---|---|---|---|---|
| Ex. 50 | (58) | GMA | 1.0 | 10 | 90,000 |
| Ex. 59 | (71) | 2HEMA | 1.0 | 10 | 80,000 |
| Ex. 60 | (72) | ETOMA | 1.0 | 10 | 80,000 |
| Ex. 61 | (73) | GA | 1.0 | 10 | 80,000 |
| Ex. 62 | (74) | 2HEA | 1.0 | 10 | 80,000 |
| Ex. 63 | (75) | ETOA | 1.0 | 10 | 90,000 |
| Ex. 64 | (76) | GMA<br>2HEA | 0.5<br>0.5 | 10 | 90,000 |
| Ex. 65 | (77) | GMA | 0.3 | 8 | 80,000 |
| Ex. 66 | (78) | GMA | 3.0 | 9 | 80,000 |
| Com. Ex. 30 | (61) | GMA | 0 | 4 | 90,000 |
| Com. Ex. 32 | (63) | GMA | 12 | 4 | 80,000 |

EXAMPLES 67 TO 69 AND COMPARATIVE EXAMPLES 34 TO 37

The samples (79) to (85) were obtained in the same manner as in Example 50 except that 1.0 part of TBHP was replaced by a polymerization initiator shown in Table 11. The obtained samples were subjected to the above-mentioned evaluation on the roll peeling property. Table 11 shows the results.

As indicated by samples (79) to (81), from the results shown in Table 11, it is found that a composition having an excellent roll peeling property is obtained when the particular polymerization initiator is used in an amount of the present invention. On the other hand, when the particular polymerization initiator is not used and an amount thereof is out of the range of the present invention, that is, in the case of samples (82) to (85), there is a reduction in the roll peeling property.

TABLE 11

| Example No. | Sample | Organic peroxide Kind | Amount (parts) | Roll peeling property | Weight average molecular weight |
|---|---|---|---|---|---|
| Ex. 50 | (58) | TBHP | 1.0 | 10 | 90,000 |
| Ex. 67 | (79) | TBHP | 0.3 | 9 | 150,000 |
| Ex. 68 | (80) | di-tert-butyl peroxide | 1.0 | 10 | 80,000 |
| Ex. 69 | (81) | TBHP<br>di-tert-butyl peroxide | 0.5<br>0.5 | 10 | 90,000 |
| Com. Ex. 34 | (82) | paramentane hydroperoxide | 1.0 | 3 | 80,000 |
| Com. Ex. 35 | (83) | cumene hydroperoxide | 1.0 | 3 | 90,000 |
| Com. Ex. 36 | (84) | benzoyl peroxide | 1.0 | 3 | 90,000 |
| Com. Ex. 37 | (85) | TBHP<br>cumene hydroperoxide | 0.05<br>1.0 | 3 | 90,000 |

EXAMPLES 70 TO 72 AND COMPARATIVE EXAMPLES 38 AND 39

Sample (58) obtained in Example 50 was blended with a vinyl chloride resin and additives at the ratios shown in Table 12. The obtained samples were subjected to the evaluation on the transparency and roll peeling property. Table 12 shows the results.

From the results shown in Table 12, it is found that a composition having an excellent roll peeling property is obtained when the amounts of addition are in the range of the present invention.

TABLE 12

| Example No. | Poly (vinyl chloride) (parts) | Polymer (58) (parts) | Stabilizer (parts) | Lubricant (parts) | DOP (parts) | Transparency Transmittance (%) | Haze (%) | Roll peeling property |
|---|---|---|---|---|---|---|---|---|
| Ex. 70 | 100 | 1.0 | 2.0 | 1.0 | 3.0 | 84.0 | 21.0 | 10 |
| Ex. 71 | 100 | 0.3 | 2.0 | 1.0 | 3.0 | 85.4 | 20.9 | 7 |
| Ex. 72 | 100 | 15 | 2.0 | 1.0 | 3.0 | 81.3 | 21.3 | 9 |

TABLE 12-continued

| Example No. | Poly (vinyl chloride) (parts) | Polymer (58) (parts) | Stabilizer (parts) | Lubricant (parts) | DOP (parts) | Transparency Transmittance (%) | Haze (%) | Roll peeling property |
|---|---|---|---|---|---|---|---|---|
| Com. Ex. 38 | 100 | 0 | 2.0 | 1.0 | 3.0 | 86.0 | 20.7 | 1 |
| Com. Ex. 39 | 100 | 25 | 2.0 | 1.0 | 3.0 | 72.4 | 29.8 | 4 |

EXAMPLES 73 TO 80 AND COMPARATIVE EXAMPLES 40 TO 47

Sample (58) obtained in Example 50 was blended with a thermoplastic resin and a mixture of poly(vinyl chloride) and another thermoplastic resin at the ratios shown in Table 13, and the obtained samples were subjected to the evaluation on the roll peeling property. Table 13 shows the results.

From the results shown in Table 13, it is found that a composition having an excellent roll peeling property is obtained when the amounts of addition are in the range of the present invention. In Examples 70, 73, 80 and Comparative Examples 38, 40 and 47, there were added 2.0 parts of octyl tin mercaptan based stabilizer (TVS #8831 available from Nitto Kasei K.K.), 1.0 part of a lubricant (KALCOHL 8668 available from Kao Corp.), and 3.0 parts of DOP thereto.

TABLE 13

| Example No. | Poly (vinyl chloride) resins (parts) | | Thermoplastic resin (parts) | | | | | | Polymer (58) (parts) | Roll peeling property |
|---|---|---|---|---|---|---|---|---|---|---|
| | PVC | CPVC | PP | PET | PC | PS | PMMA | ABS | | |
| Ex. 70 | 100 | | | | | | | | 1.0 | 10 |
| Ex. 73 | | 100 | | | | | | | 1.0 | 9 |
| Ex. 74 | | | 100 | | | | | | 1.0 | 9 |
| Ex. 75 | | | | 100 | | | | | 1.0 | 9 |
| Ex. 76 | | | | | 100 | | | | 1.0 | 9 |
| Ex. 77 | | | | | | 100 | | | 1.0 | 9 |
| Ex. 78 | | | | | | | 100 | | 1.0 | 9 |
| Ex. 79 | | | | | | | | 100 | 1.0 | 10 |
| Ex. 80 | 70 | | | | | | | 30 | 1.0 | 10 |
| Com. Ex. 38 | 100 | | | | | | | | 0 | 1 |
| Com. Ex. 39 | | 100 | | | | | | | 0 | 1 |
| Com. Ex. 40 | | | 100 | | | | | | 0 | 1 |
| Com. Ex. 41 | | | | 100 | | | | | 0 | 1 |
| Com. Ex. 42 | | | | | 100 | | | | 0 | 1 |
| Com. Ex. 43 | | | | | | 100 | | | 0 | 1 |
| Com. Ex. 44 | | | | | | | 100 | | 0 | 1 |
| Com. Ex. 45 | | | | | | | | 100 | 0 | 1 |
| Com. Ex. 46 | 70 | | | | | | | 30 | 0 | 1 |

INDUSTRIAL APPLICABILITY

A thermoplastic resin composition containing the processing aid for thermoplastic resin of the present invention is excellent in peeling property from a metal surface at a high temperature as compared with conventional resins, and provides a longer processable time.

What is claimed is:

1. A processing aid for thermoplastic resin having a weight average molecular weight of 10,000 to 300,000, which is obtained by multi-step emulsion-polymerizing a composition consisting essentially of 0.1 to 5% by weight of a (meth)acrylate having an oxygen atom in addition to an ester bond, 10 to 99.9% by weight of another alkyl acrylate, and 0 to 89.9% by weight of another vinyl monomer copolymerizable therewith, in the presence of an organic peroxide having a tertiary-butyl peroxy group as a polymerization initiator, wherein the other vinyl monomer copolymerizable therewith is at least one vinyl monomer selected from the group consisting of alkyl (meth)acrylates, aromatic vinyls, acrylonitrile and methacrylonitrile, and wherein an amount of the organic peroxide having a tertiary-butyl peroxy group is 0.1 to 5 parts by weight based on 100 parts by weight of the entire monomers.

2. A thermoplastic resin composition comprising 100 parts by weight of a thermoplastic resin and 0.1 to 20 parts by weight of the processing aid for thermoplastic resin in claim 1.

3. The thermoplastic resin composition of claim 2, wherein the thermoplastic resin is at least one resin selected from the group consisting of poly(vinyl chloride) resins, polyethylene, polypropylene, polyester, polystyrene, polycarbonate, a methacrylate resin and an ABS resin.

4. The processing aid for thermoplastic resin of claim 1, wherein the (meth)acrylate having an oxygen atom in addition to an ester bond is a (meth)acrylate containing an epoxy group.

5. The processing aid for thermoplastic resin of claim 1, wherein the (meth)acrylate having an oxygen atom in addition to an ester bond is a (meth)acrylate containing a hydroxy group.

6. The processing aid for thermoplastic resin of claim 1, wherein the (meth)acrylate having an oxygen atom in addition to an ester bond is a (meth)acrylate containing an alkoxy group.

7. A processing aid for thermoplastic resin having a weight average molecular weight of 10,000 to 300,000, which is obtained by emulsion-polymerizing 0.1 to 5% by weight of a (meth)acrylate containing an epoxy group, 10 to 99.9% by weight of another alkyl acrylate, and 0 to 89.9% by weight of another vinyl monomer copolymerizable therewith, in the presence of a mercaptan having an alkyl ester group with $C_{4-20}$ alkyl group as a chain transfer agent.

8. A processing aid for thermoplastic resin having a weight average molecular weight of 10,000 to 300,000, which is obtained by emulsion-polymerizing 0.1 to 5% by weight of a (meth)acrylate containing an epoxy group, 10 to 99.9% by weight of another alkyl acrylate, and 0 to 89.9% by weight of another vinyl monomer copolymerizable therewith, in the presence of a mercaptan having an alkyl ester group with $C_{4-20}$ alkyl group as a chain transfer agent, wherein the other vinyl monomer copolymerizable therewith is at least one vinyl monomer selected from the group consisting of alkyl (meth)acrylates, aromatic vinyls, acrylonitrile and methacrylonitrile.

* * * * *